(12) United States Patent
Xing

(10) Patent No.: US 12,045,537 B1
(45) Date of Patent: Jul. 23, 2024

(54) AUXILIARY DISPLAY DEVICE OF LED MODULE AND LED DISPLAY

(71) Applicant: UNILUMIN GROUP CO., LTD, Shenzhen (CN)

(72) Inventor: Qianghong Xing, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 0 days.

(21) Appl. No.: 18/486,352

(22) Filed: Oct. 13, 2023

(30) Foreign Application Priority Data

May 22, 2023 (CN) .......................... 202321239607.6

(51) Int. Cl.
*G09G 3/32* (2016.01)
*G06F 3/147* (2006.01)

(52) U.S. Cl.
CPC .............. *G06F 3/147* (2013.01); *G09G 3/32* (2013.01); *G09G 2300/0426* (2013.01); *G09G 2310/0262* (2013.01); *G09G 2330/021* (2013.01); *G09G 2330/027* (2013.01); *G09G 2370/00* (2013.01)

(58) Field of Classification Search
CPC .. G06F 3/147; G09G 3/32; G09G 2300/0426; G09G 2310/0262; G09G 2330/021; G09G 2330/027; G09G 2370/00
See application file for complete search history.

(56) References Cited

U.S. PATENT DOCUMENTS

| 11,670,224 B1* | 6/2023 | Cheng | G09G 3/32 |
| | | | 345/212 |
| 2020/0267344 A1 | 8/2020 | Li et al. | |
| 2022/0189380 A1* | 6/2022 | Wang | G09G 3/3275 |
| 2022/0208076 A1* | 6/2022 | Shao | G09G 3/32 |

FOREIGN PATENT DOCUMENTS

| CN | 112382231 A | 2/2021 |
| CN | 113936588 A | 1/2022 |

OTHER PUBLICATIONS

European Search Report issued in counterpart European Patent Application No. EP 23205283.7, dated Apr. 4, 2024.
Mkdas, Make a soft starter for AC loads-Lab Projects BD Electronics, 2020, retrieved from the Internet: URL: https://labprojectesbd.com/2020/07/11/soft-starter-for-ac-loads/, pp. 1-23, dated Jul. 11, 2020.

* cited by examiner

*Primary Examiner* — Jonathan A Boyd
(74) *Attorney, Agent, or Firm* — Westbridge IP LLC

(57) ABSTRACT

Disclosed are an auxiliary display device of a light emitting diode (LED) module and an LED display. The auxiliary display device includes a shared hub provided with a dual input port and an independent output port. The dual input port is configured to receive a dual supply voltage, and the dual supply voltage includes a first voltage and a second voltage. The independent output port is connected to a common anode LED module and/or a common cathode LED module. A first LED of the common anode LED module and a second LED of the common anode LED module are configured to receive the first voltage; and a first LED of the common cathode LED module is configured to receive the first voltage, and a second LED of the common cathode LED module is configured to receive the second voltage.

10 Claims, 5 Drawing Sheets

AUXILIARY DISPLAY DEVICE OF LED MODULE AND LED DISPLAY

CROSS-REFERENCE TO RELATED APPLICATIONS

The present application claims priority to Chinese Patent Application No. 202321239607.6, filed on May 22, 2023, the entire contents of which are incorporated herein by reference.

TECHNICAL FIELD

The present application relates to the technical field of display screens, in particular to an auxiliary display device of a light emitting diode (LED) module and an LED display.

BACKGROUND

With the continuous advancement of scientific and technological innovations, the LED display industry has experienced over two decades of rapid development. It has been widely adopted in various major fields such as commercial displays, conferences, performing arts, and traffic indicators, which creates a vast demand and application market. However, as environmental concerns escalate and strategies like carbon neutrality are implemented, the energy-saving requirements for LED displays have become increasingly stringent.

Traditional LED displays typically utilize two LED technologies due to differences in LED packaging structures: the common anode LED energy-saving technology and the common cathode LED energy-saving technology. Common cathode energy-saving LEDs can only be used with common cathode hubs, while common anode energy-saving LEDs can only be used with common anode hubs. The diversity and dispersion of materials pose challenges for factories to uniformly and collectively purchase source materials, which hinders the enhancement of mass production efficiency for LED displays.

SUMMARY

The main objective of the present application is to provide an auxiliary display device of an LED module and an LED display, which may improve the mass production efficiency of LED display screens for the above technical problems.

In some embodiments, the present application provides an auxiliary display device of an LED module, including a shared hub provided with a dual input port and an independent output port. The dual input port is configured to receive a dual supply voltage including a first voltage and a second voltage; and the independent output port is connected to a common anode LED module and/or a common cathode LED module.

The common anode LED module includes a first LED and a second LED, and the common cathode LED module includes a first LED and a second LED;

The first LED of the common anode LED module and the second LED of the common anode LED module are configured to receive the first voltage; and the first LED of the common cathode LED module is configured to receive the first voltage, and the second LED of the common cathode LED module is configured to receive the second voltage.

In some embodiments, the auxiliary display device of LED module further includes a dual output power connected to the shared hub; and the dual output power is configured to output the dual supply voltage to the shared hub through the dual input port.

In some embodiments, the dual input port of the shared hub includes a first input port and a second input port, the first input port is connected to the first voltage, and the second input port is connected to the second voltage.

In some embodiments, the auxiliary display device of LED module further includes a black screen control circuit; and the shared hub is connected to the common anode LED module and/or the common cathode LED module through the black screen control circuit.

In some embodiments, the black screen control circuit includes a first switch circuit and a second switch circuit; a control end of the first switch circuit is connected to the shared hub; a first end of the first switch circuit is connected to a supply power through the second switch circuit, and a second end of the first switch circuit is grounded; and a control end of the second switch circuit is connected to the supply power, an input end of the second switch circuit is connected to the supply power, and an output end of the second switch circuit is connected to the dual supply voltage, the common anode LED module and/or the common cathode LED module.

In some embodiments, the black screen control circuit further includes a filter circuit connected to the dual supply voltage and the second switch circuit.

In some embodiments, the second switch circuit includes a first resistance, a first capacitor, a first inductance and a row driver transistor; the supply power is connected to a grid electrode of the row driver transistor through a parallel connection of the first resistance and the first capacitor; the supply power is connected to a source electrode of the row driver transistor; the supply power is connected to a drain electrode of the row driver transistor through the first inductance; and an output of the drain electrode of the row driver transistor is configured to drive the dual supply voltage to supply power to the common anode LED module and/or the common cathode LED module.

In some embodiments, the auxiliary display device of LED module further includes an inductor and a driver. The inductor is connected to the driver, and the driver is connected to the shared hub; the driver is configured to receive a standby instruction sent by the inductor, and is configured to send a low level signal to the shared hub; and the low level signal is configured to control the black screen control circuit to cut off, and the standby instruction is an instruction sent by the inductor when the inductor fails to receive a display signal during a preset time.

The present application further provides an LED display, including the auxiliary display device of LED module as described above, a common anode LED module and/or a common cathode LED module.

In some embodiments, the common anode LED module includes a first LED of the common anode LED module, a second LED of the common anode LED module, and a common anode constant current chip, and the common anode constant current chip is connected to the first LED of the common anode LED module and the second LED of the common anode LED module; and the common cathode LED module includes a first LED of the common cathode LED module, a second LED of the common cathode LED module, and a common cathode constant current chip, and the common cathode constant current chip is connected to the first LED of the common cathode LED module and the second LED of the common cathode LED module.

The above-mentioned auxiliary display device of LED module and LED display include a shared hub provided with a dual input port and an independent output port. The dual input port is configured to receive a dual supply voltage which includes a first voltage and a second voltage. The independent output port is connected to a common anode LED module and/or a common cathode LED module. The independent output port is configured to output the first voltage to a first LED of the common anode LED module, a second LED of the common anode LED module and a first LED of the common cathode LED module, and is configured to output the second voltage to a second LED of the common cathode LED module. The dual input port of the shared hub is configured to receive the dual supply voltage. The independent output port of the shared hub may match the interfaces of the common anode LED module and the common cathode LED module, allowing for the selection of connection to common anode LED module and/or to the common cathode LED modules. In this way, it unifies the material requirements for common anode LED module and common cathode LED module, standardizes the specifications of hubs used in LED displays, facilitates the unified collection of materials by factory, and improves the efficiency of batch production of LED displays.

DETAILED DESCRIPTION OF THE EMBODIMENTS

In order to more clearly illustrate the purpose, the technical solutions and the advantages of the present application, the present application will be described in further detail below in conjunction with the accompanying drawings and embodiments. It should be noted that the specific embodiments are only used for explaining the present application, and are not intended to limit the present application.

It can be understood that the terms "first", "second" and the like used in the present application may be used to describe various elements herein, but these elements are not limited by these terms. These terms are only used to distinguish one element from another element. For example, in the scope of the present application, a first resistance could be termed a second resistance, and likewise a second resistance could be termed a first resistance. Both the first resistance and the second resistance are resistances, but they are not the same resistance.

It can be understood that the terms related to "connection" in the following embodiments should be understood as "electrical connection", "communication connection", etc. if the connected circuits, modules, units, etc. have the transmission of electric signals or data between each other.

When used herein, the singular form terms such as "a", "an" and "the/the said" may also include the plural form unless the context clearly dictates otherwise. It should also be understood that the terms "comprising/including" or "having" etc. specify the presence of stated features, integers, steps, operations, components, parts or combinations thereof, but do not exclude the presence or addition of one or more other features, integers, steps, operations, components, parts or combinations thereof.

Unless otherwise defined, all technical and scientific terms used herein have the same meaning as commonly understood by those skilled in the art. The terms used herein in the specification of the present application are only for the purpose of describing specific embodiments, and are not intended to limit the present application.

Figure 1:
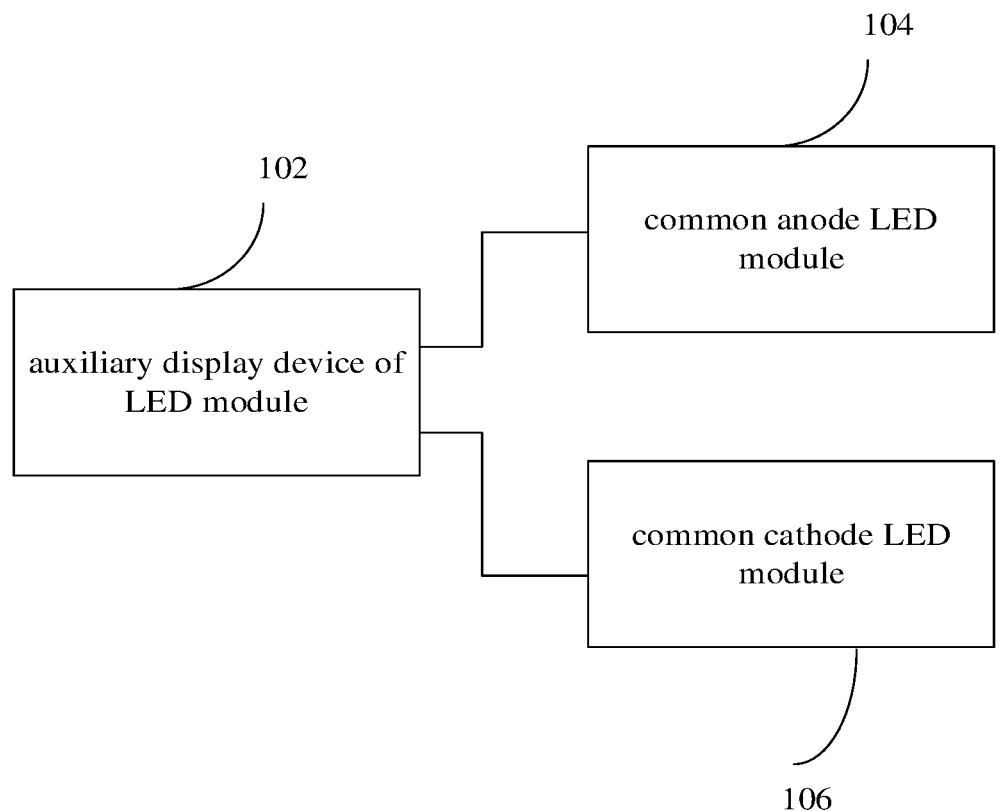
FIG. 1 is an application environment view of an auxiliary display device of LED module according to some embodiments of the present application.

The auxiliary display device 102 of LED module provided in the embodiment of the present application can be applied in the application environment as shown in FIG. 1. The auxiliary display device 102 of LED module is connected to the common anode LED module 104 and the common cathode LED module 106, and is compatible with the LED modules of these two energy-saving technologies, and can independently and accurately supply the corresponding voltages required to the common anode LED module 104 and the common cathode LED module 106 when the power supply is connected. Likewise, the auxiliary display device 102 of LED module can also only be connected to the common anode LED module 104, or the auxiliary display device 102 of LED module can only be connected to the common cathode LED module 106. The common anode LED module 104 or the common cathode LED module 106 can be selected separately or both can be selected according to the production requirements of the staff. The common cathode LED module 106 is an LED display panel adopting the common cathode energy-saving technology, the common anode LED module 104 is an LED display panel adopting the common anode energy-saving technology, and the model and power size of the common anode LED module 104 and the common cathode LED module 106 are not limited.

Figure 2:
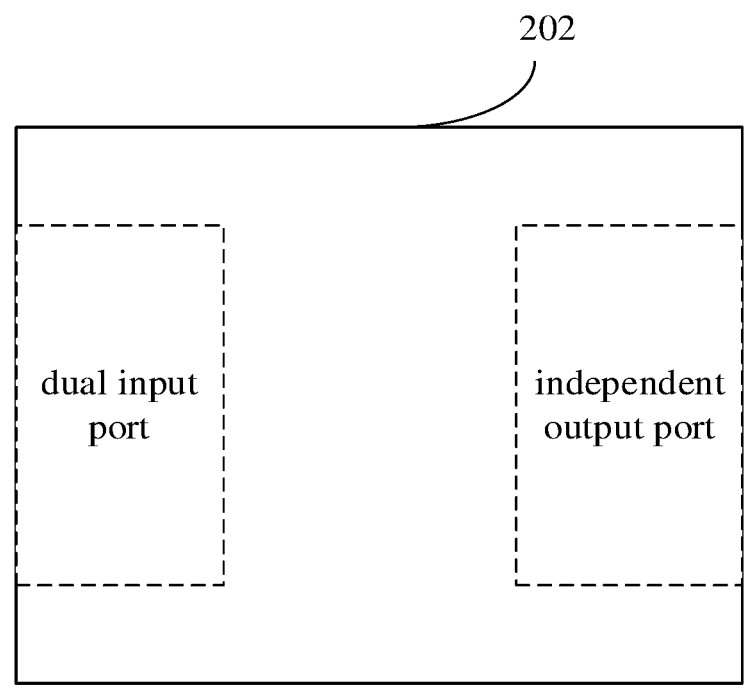
FIG. 2 is a schematic structure view of the auxiliary display device of LED module according to some embodiments of the present application.

In some embodiments, as shown in FIG. 2, the present application provides an auxiliary display device 102 of LED module. The auxiliary display device 102 of LED module includes a shared hub 202 provided with a dual input port and an independent output port. The dual input port is configured to receive a dual supply voltage and the dual supply voltage includes a first voltage and a second voltage. The independent output port is connected to a common anode LED module 104 and/or a common cathode LED module 106. The independent output port outputs the first voltage to a first LED of the common anode LED module 104, a second LED of the common anode LED module 104, and a first LED of the common cathode LED module 106, and outputs the second voltage to a second LED of the common cathode LED module 106.

Since the common anode LED module 104 and the common cathode LED module 106 usually contain a large number of LEDs, and the LEDs are classified according to the different required voltages. To achieve power supply, the LEDs of different categories are individually connected to corresponding anode integrated lines and cathode integrated lines, which are then led out and connected to the power source. For common anode LED modules, the anode integration lines are combined into one, which plays the role of common anode energy saving. For common cathode LED modules, the cathode integration lines are combined into one, which plays the role of common cathode energy saving. In order to reduce wiring difficulty and staff operation difficulty, the anode integration line and the cathode integration line are usually connected to the hub, and the voltages required by the common anode LED module 104 and the common cathode LED module 106 are transmitted through the hub. Meanwhile, no matter it is the common anode LED module 104 or the common cathode LED module 106, since the LEDs of different colors may require different voltages, the common anode LED module 104 and the common cathode LED module 106 require different levels of supply voltage. Since the common anode LED module 104 adopts the common anode energy-saving technology, the common anode LED module 104 can obtain only one positive supply voltage (two negative voltages are still required). Since the common cathode LED module 106 adopts the common cathode energy-saving technology, the common cathode LED module 106 can obtain only one negative voltage supply voltage (two positive voltages are still required). In the present application, the power supply voltage is a dual supply voltage, including a first voltage and a second voltage, which can supply power to LEDs with different voltage requirements. The LEDs that require the first voltage are referred to as the first LED, and the LEDs that require the second voltage are referred to as the second LED. In the common anode LED module 104, the first LED and the second LED have a common anode; in the common cathode LED module 106, the first LED and the second LED have a common cathode.

In some embodiments, the shared hub 202 is compatible with the common anode LED module 104 and the common cathode LED module 106. In the shared hub 202, there are dual input ports designed to accommodate the input of dual power voltages, and there are also independent output ports for separately delivering the dual power voltages. The independent output described here means that the lines corresponding to the first voltage and the second voltage in the shared hub 202 are independent from each other, and the positive and negative voltages of the two power supply voltages, the first voltage and the second voltage, are completely independent. Due to the common anode energy-saving technology of the common anode LED module 104, the independent output port outputs the first voltage to the first LED of the common anode LED module 104, and can also output the first voltage to the first LED and the second LED of the common anode LED module 104. In addition, the independent output port may not output the second voltage to the common anode LED module 104, or the independent output port may output the second voltage to the common anode LED module 104, but the common anode LED module 104 does not receive the second voltage. When the common anode LED module 104 receives the second voltage, it may not receive the positive voltage of the second voltage, and only conduct the negative voltage of the second voltage. Correspondingly, the common cathode energy-saving technology of the common cathode LED module 106 also has similar voltage processing, which will not be repeated here.

In some embodiments, the first voltage includes a first positive voltage and a first negative voltage, and the second voltage includes a second positive voltage and a second negative voltage. The dual input port receives the dual power supply voltages in the form of separate input of the first voltage and the second voltage. The route for transmitting the first positive voltage, the route for transmitting the first negative voltage, the route for transmitting the second positive voltage, and the route for transmitting the second negative voltage are separated inside the shared hub 202. The dual supply voltage at the independent output port is reallocated to deliver the output of the first positive port and the second positive port to the connected LED module (whether it is common cathode LED module 106 or common anode LED module 104), and to deliver the output of the first negative port and the second negative port to the connected LED module (whether it is common cathode LED module 106 or common anode LED module 104).

In some embodiments, when the shared hub 202 is connected to the common anode LED module 104, due to the common anode technology of the common anode LED module 104, the first positive port and the second positive port are commonly connected to the common anode LED module 104, and the first negative port and the second negative port are respectively connected to the corresponding cathodes of the common anode LED module 104. In some embodiments, the first negative port is connected to the cathode of the first LED, and the second negative port is connected to the cathode of the second LED. When the shared hub 202 is connected to the common cathode LED module 106, due to the common cathode technology of the common cathode LED module 106, the first positive port and the second positive port are respectively connected to the corresponding anodes of the common cathode LED module 106. The first negative port and the second negative port are commonly connected to the common cathode of the common cathode LED module 106. In some embodiments, the first positive port is connected to the anode of the first LED, and the second positive port is connected to the anode of the second LED. When the shared hub 202 is connected to the common anode LED module 104 and the common cathode LED module 106, the first positive port and the second positive port are commonly connected to the common anode of the common anode LED module 104 and correspondingly connected to the anode of the first LED of the common cathode LED module 106 and the anode of the second LED of the common cathode LED module 106. The first negative port and the second negative port are respectively connected to cathode of the first LED of the common anode LED module 104 and the cathode of the second LED of the common anode LED module 104, and are commonly connected to the common cathode of the common cathode LED module 106.

In some embodiments, the first LED can be blue and/or green LED, correspondingly, the first voltage is plus or minus 3.8V, the first positive voltage is plus 3.8V, and the first negative voltage is minus 3.8V. The second LED can be red LED, correspondingly, the second voltage is plus or minus 2.8V, the second positive voltage is plus 2.8V, and the second negative voltage is minus 2.8V. Multiple independent output ports can be provided to match the number of the common anode LED modules 104 and the common cathode LED modules 106.

The above-mentioned auxiliary display device 102 of LED module includes a shared hub 202, and the shared hub 202 has a dual input port and an independent output port. The dual input port receives a dual supply voltage, and the dual supply voltage includes a first voltage and a second voltage. The independent output port is connected to the common anode LED module 104 and/or the common cathode LED module 106. The independent output port outputs the first voltage to the first LED of the common anode LED module 104, the second LED of the common anode LED module 104, and the first LED of the common cathode LED module 106; and outputs the second voltage to the second LED of the common cathode LED module 106. The dual input port of the shared hub 202 can receive the dual supply voltage, and the independent output port of the shared hub 202 can match the interfaces of the common anode LED module 104 and/or the common cathode LED module 106, which can be selected to connect to the common anode LED module 104/or common cathode LED module 106. It is possible to unify the material requirements of the common anode LED module 104 and the common cathode LED module 106, and unify the specifications of the hubs used by the LED display, which facilitates the unified purchase of materials by the factory and improves the efficiency of mass production of the LED display.

Figure 3:
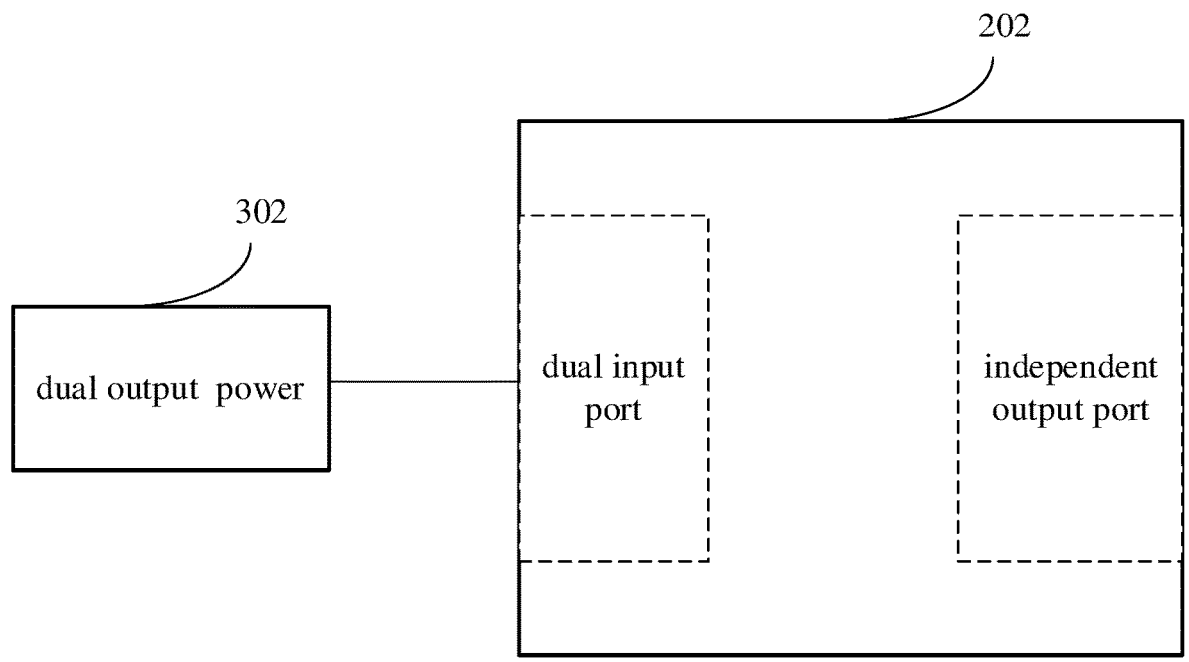
FIG. 3 is a schematic structure view of the auxiliary display device of LED module according to some other embodiments of the present application.

In some embodiments, as shown in FIG. 3, the auxiliary display device 102 of LED module includes a dual output power 302 connected to the shared hub 202, and the dual output power 302 outputs the dual supply voltage to the shared hub 202 through the dual input port.

In some embodiments, in order to be able to provide dual supply voltage to the common anode LED module 104 and the common cathode LED module 106, the auxiliary display device 102 of LED module may include a dual output power 302, and the dual output power 302 is used to generate the dual supply voltage which may be transmitted to the shared hub 202. The dual output power 302 includes dual transformers, one of which outputs the first voltage, and the other outputs the second voltage, thereby realizing the output of dual supply voltages. Each transformer can meet the different voltage requirements of the first LED and the second LED, such that the output of the first voltage and the second voltage can precisely meet the requirements of the first LED and the second LED, which may improve the energy-saving effect.

In some embodiments, the combination of the dual output power 302 and the shared hub 202 is used to provide auxiliary power supply to the LED module, which can avoid wiring confusion caused by multiple power supplies, and the wiring is simple, making the operation easier for staff to achieve higher assembly efficiency. It can also realize the normalization of materials, which facilitates the collective collection and storage, and is convenient for factories to improve assembly production efficiency during a large-scale production of products.

In some embodiments, the dual input port of the shared hub 202 includes a first input port and a second input port, and the first input port is connected to the first voltage and the second input port is connected to the second voltage.

As described above, the dual input port of the shared hub 202 receives the dual supply voltage in the form of separate input of the first voltage and the second voltage. In some embodiments, the dual input port of the shared hub 202 includes a first input port and a second input port. Correspondingly, the first input port is connected to the first voltage, and the second input port is connected to the second voltage.

Figure 4:
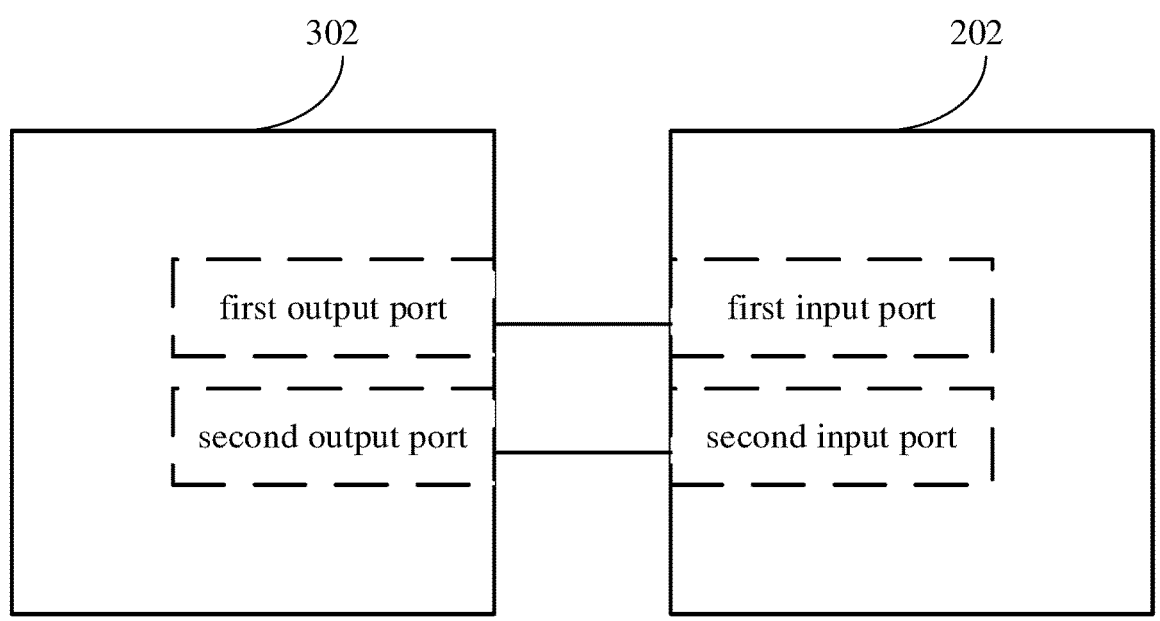
FIG. 4 is a schematic view of a connection between a dual output power and a shared hub according to some embodiments of the present application.

The dual input port of the shared hub 202 includes a first input port and a second input port. As shown in FIG. 4, when the auxiliary display device 102 of LED module includes a dual output power 302, the dual output power 302 also has a dual output port corresponding to the shared hub 202, and the dual output port includes the first output port and a second output port. The first output port of the dual output power 302 outputs the first voltage of the dual supply voltage to the first input port of the shared hub 202, and the second output port of the dual output power 302 outputs the second voltage of the dual supply voltage to the second input port of the dual output power 302. In some embodiments, the first voltage transmitted between the first output port and the first input port is plus and minus 3.8V, and the second voltage transmitted between the second output port and the second input port is plus and minus 2.8V.

Figure 5:
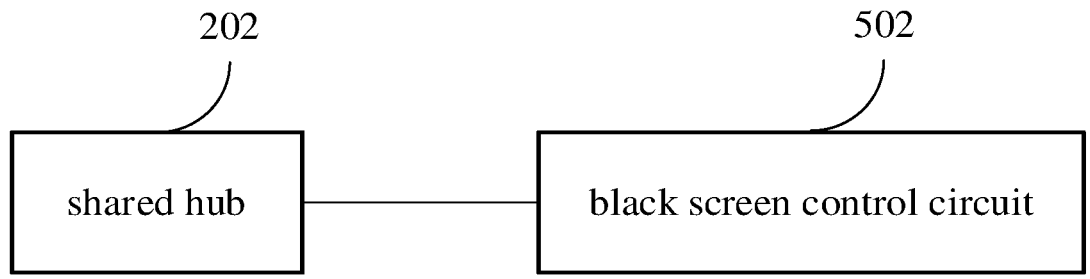
FIG. 5 is a schematic structural view of the auxiliary display device of LED module according to some other embodiments of the present application.

In some embodiments, as shown in FIG. 5, the auxiliary display device 102 of LED module further includes a black screen control circuit 502, and the shared hub 202 is connected to the common anode LED module 104 and/or the common cathode LED module 106 through the black screen control circuit 502.

In order to further improve the energy-saving effect and reduce the loss of electric energy when the LED module is idle, a black screen control circuit 502 connected to the shared hub 202 is added. The black screen control circuit 502 is connected to the common anode LED module 104 and the common cathode LED module 106, and can adjust the working states of the common anode LED module 104 and the common cathode LED module 106. In some embodiments, the shared hub 202 is connected to the LED of the common anode LED module 104 and the common cathode LED module 106 (including the first LED and the second LED of the common anode LED module 104, and the first LED and the second LED of the common cathode LED module 106). The shared hub 202 connects the constant current chips of the common anode LED module 104 and the common cathode LED module 106 through the black screen control circuit 502. When the black screen control circuit 502 is in the cut-off state, the constant current chips of the common anode LED module 104 and the common cathode LED module 106 lose power supply, and the common anode LED module 104 and the common cathode LED module 106 connected to the shared hub 202 enter an energy saving state of black screen.

The black screen control circuit 502 provided in these embodiments can automatically cut off the display of the common anode LED module 104 and the common cathode LED module 106 without repeatedly switching the screen when the common anode LED module 104 and the common cathode LED module 106 are not in use for a short time. The power consumption of the common anode LED module 104 and the common cathode LED module 106 can be reduced during actual use, which is safe and reliable.

Figure 6:
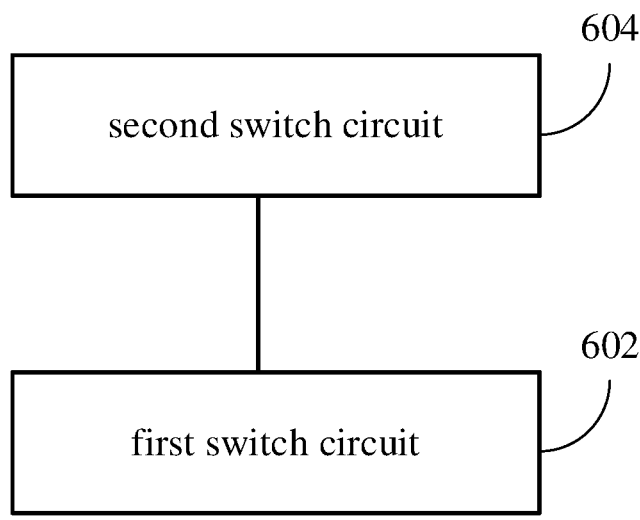
FIG. 6 is a schematic structural view of a black screen control circuit according to some embodiments of the present application.

In some embodiments, as shown in FIG. 6, the black screen control circuit 502 includes a first switch circuit 602 and a second switch circuit 604. A control end of the first switch circuit 602 is connected to the shared hub 202. A first end of the first switch circuit 602 is connected to a supply power through the second switch circuit 604, and a second end of the first switch circuit 602 is grounded. A control end of the second switch circuit 604 is connected to the supply power, an input end of the second switch circuit 604 is connected to the supply power, and an output end of the second switch circuit 604 is connected to the dual supply voltage, the common anode LED module 104 and/or the common cathode LED module 106.

In some embodiments, the black screen control circuit 502 includes a first switch circuit 602 and a second switch circuit 604, the control end of the first switch circuit 602 is connected to the shared hub 202, and the shared hub 202 transmits a level signal to the control end of the first switch circuit 602. The level signal includes a high level signal and a low level signal, and the level signal may be a signal transmitted from any terminal or device to the shared hub 202.

When the control end of the first switch circuit 602 receives a high level signal, the first switch circuit 602 is turned on. When the first switch circuit 602 is turned on, the first end of the first switch circuit 602 and the second end of the first switch circuit 602 are turned on, and the power supply is grounded through the second switch circuit 604 and the first switch circuit 602. When the power supply is grounded through the second switch circuit 604 and the first switch circuit 602, the control end of the second switch circuit 604 is short-circuited, that is to say, the control end of the second switch circuit 604 is powered off. When the control end of the second switch circuit 604 is powered off, the second switch circuit 604 is turned on. Driven by the second switch circuit 604, the dual supply voltage supplies power to the constant current chip, thereby to maintain normal display of the common anode LED module 104 and the common cathode LED module 106.

When the control end of the first switch circuit 602 receives a low-level signal, the first switch circuit 602 is cut off. When the first switch circuit 602 is cut off, the first end of the first switch circuit 602 and the second end of the first switch circuit 602 are cut off, and the power supply cannot be grounded through the second switch circuit 604 and the first switch circuit 602. When the power supply is not grounded, the control end of the second switch circuit 604 is connected to the power supply. When the control end of the second switch circuit 604 is powered on, the second switch circuit 604 is cut off. Without the driving of the second switch circuit 604, the dual supply voltage cannot supply power to the constant current chip. Such that the common anode LED module 104 and the common cathode LED module 106 are turned off, thereby realizing the energy-saving effect of black screen.

In these embodiments, whether the common anode LED module 104 and the common cathode LED module 106 are powered is controlled by the on-off state of the first switch circuit 602 and the on-off state of the second switch circuit 604. The staff can change the on-off state of the first switch circuit 602 and the second switch circuit 604 to realize the energy-saving effect of the sleep screen of the common anode LED module 104 and the common cathode LED module 106.

Figure 7:
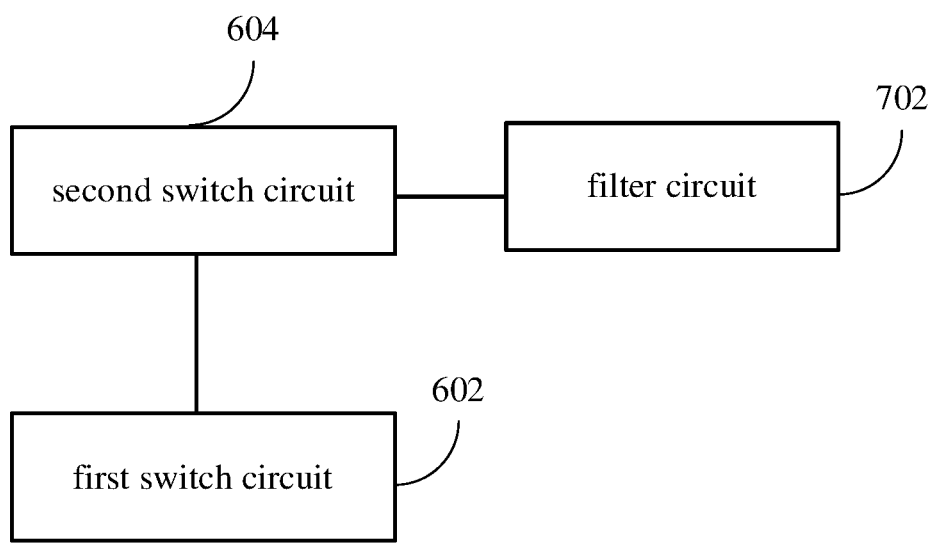
FIG. 7 is a schematic structural view of the black screen control circuit according to some other embodiments of the present application.

In some embodiments, as shown in FIG. 7, the black screen control circuit 502 further includes a filter circuit 702 connected to the dual supply voltage and the second switch circuit 604.

Figure 8:
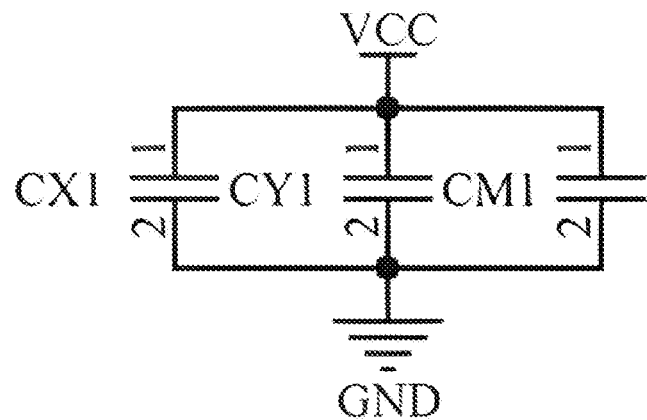
FIG. 8 is a schematic structural view of a filter circuit according to some embodiments of the present application.

In some embodiments, the filter circuit 702 can filter the high-frequency interference in the dual supply voltage, and improve the stability of the dual power supply voltage. The dual power supply voltage includes a first voltage and a second voltage, the first voltage includes a first positive voltage and a first negative voltage, and the second voltage includes a second positive voltage and a second negative voltage. The filter circuit 702 is connected to the first positive voltage and the second positive voltage. As shown in FIG. 8, one end of the filter circuit 702 is connected to the voltage VCC, and the other end is grounded. The filter circuit 702 includes a capacitor CX1, a capacitor CY1, and a capacitor CMI connected in parallel. The voltage VCC represents the first positive voltage and the second positive voltage. A first common end of the capacitor CX1, a capacitor CY1, and a capacitor CMI connected in parallel is connected to the voltage VCC and the second common ends are grounded.

Figure 9:
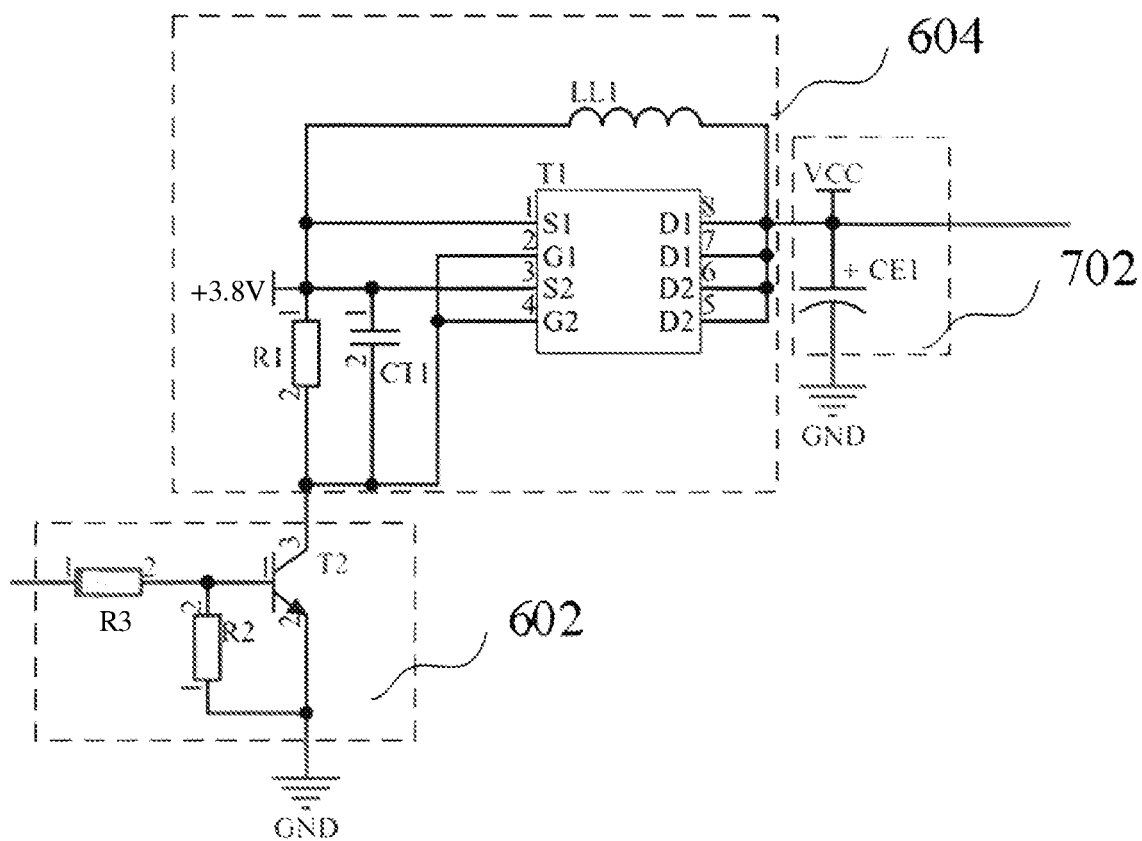
FIG. 9 is a schematic circuit view of the black screen control circuit according to some embodiments of the present application.

In some embodiments, as shown in FIG. 9, the second switch circuit includes a first resistance R1, a first capacitor CT1, a first inductance LL1 and a row driver transistor T1. The supply power is connected to a grid electrode of the row driver transistor T1 through a parallel connection of the first resistance R1 and the first capacitor CT1. The supply power is connected to a source electrode of the row driver transistor T1, the supply power is connected to a drain electrode of the row driver transistor T1 through the first inductance LL1, and an output of the drain electrode of the row driver transistor T1 is configured to drive the dual supply voltage to supply power to the common anode LED module 104 and/or the common cathode LED module 106.

The supply power is the main power source applied to the second switch circuit 604, which is mainly used as the output power when the row driver transistor T1 is turned on. The size of the power supply is not limited, as long as it can drive the dual supply voltage to supply power to the common anode LED module 104 and the common cathode LED module 106. In FIG. 9, the supply power is plus 3.8V. In some embodiments, the power supply may be a separate power input, or one of the dual supply voltages output by the dual output power 302. When the supply power is one of the dual power supply voltages of the dual output power 302, the supply power is the maximum positive voltage output of the dual supply voltages of the dual output power 302. For example, if the first voltage includes a first positive voltage and a first negative voltage, and the second voltage includes a second positive voltage and a second negative voltage. When the first positive voltage is plus 3.8V, the first negative voltage is minus 3.8V, the second positive voltage is plus 2.8V, and the second negative voltage is minus 2.8V, the supply power is the first positive voltage plus 3.8V.

The row driver transistor T1 is a device used to drive the dual supply voltage to supply power to the common anode LED module 104 and the common cathode LED module 106. It can realize serial input and parallel output, and maintain the output current of 3-45 mA for each output pin. In some embodiments, the row driver transistor T1 is a 4953 chip. Interface 2 (label G1) and interface 4 (label G2) of the 4953 chip are the grid electrode, interface 1 (label S1) and interface 3 (label S2) of the 4953 chip are the source electrode, and interface 5 (label D1), interface 6 (label D2), interface 7 (label D3) and interface 8 (label D4) of the 4953 chip are the drain electrode.

The voltage VCC connected to the second switch circuit 604 is a dual supply voltage. In some embodiments, the voltage VCC includes a first positive voltage and a second positive voltage of the dual supply voltage. The capacitor CEI connected to the voltage VCC is an implementation of the filter circuit 702.

Meanwhile, as shown in FIG. 9, the first switch circuit 602 includes a second resistor R2, a third resistor R3 and a switch transistor T2. The first end of the third resistor R3 is connected to the shared hub 202, and the second end of the third resistor R3 is connected to the control end of the switch transistor T2 and the second resistor R2. The second resistor R2 is connected to the control end of the switch transistor T2, and is grounded together with the second end of the switch transistor T2. The first end of the switch transistor T2 is connected to the supply power through the first resistor R1 of the second switch circuit 604. The switch transistor T2 may be an NPN transistor.

Figure 10:
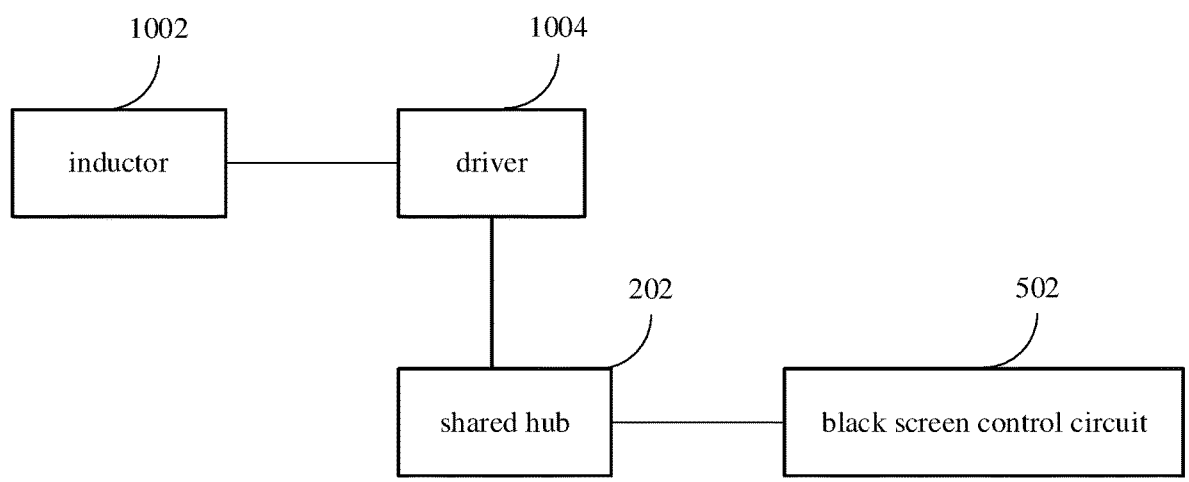
FIG. 10 is a schematic structural view of the auxiliary display device of LED module according to some other embodiments of the present application.

In some embodiments, as shown in FIG. 10, the auxiliary display device 102 of LED module further includes an inductor 1002 and a driver 1004. The inductor 1002 is connected to the driver 1004 and the driver 1004 is connected to the shared hub 202, the driver 1004 receives a standby instruction sent by the inductor 1002 and sends a low level signal to the shared hub 202, and the low level signal is configured to control the black screen control circuit 502 to cut off, and the standby instruction is an instruction sent by the inductor 1002 when the inductor fails to receive a display signal during a preset time. The setting time is not limited, for example, the setting time is 30 s.

In some embodiments, the inductor 1002 can sense whether the worker sends a display signal to the common anode LED module 104 and/or the common cathode LED module 106 connected to the shared hub 202. When the common anode LED module 104 and/or the common cathode LED module 106 receives the display signal, the common anode LED module 104 and/or the common cathode LED module 106 is in the working state to emit light; and when the common anode LED module 104 and/or the common cathode LED module 106 does not receive the display signal, the common anode LED module 104 and/or the common cathode LED module 106 are turned off in the standby state. However, when the common anode LED module 104 and/or the common cathode LED module 106 are in the standby state, if the constant current chip of the common anode LED module 104 and/or the common cathode LED module 106 continues to be powered, it will continue to consume electric energy, resulting in energy loss, which does not comply with the concept of environmental protection advocated by modern times. Therefore, the present application sets the inductor 1002 to detect whether the staff sends a display signal to the common anode LED module 104 and/or the common cathode LED module 106 connected to the shared hub 202. Such that when the inductor 1002 does not receive a display signal within the set time, the power supply of the constant current chip of the common anode LED module 104 and/or the common cathode LED module 106 is cut off (the second switch circuit 604 cuts off), thereby reducing energy consumption.

Based on the same technical idea, some embodiments of the present application also provide an LED display for realizing the above-mentioned the auxiliary display device 102 of LED module. The technical solution to the problem provided by the LED display is similar to the embodiments described in the above-mentioned auxiliary display device of the LED module 102, such that the specific limitations in one or more LED display embodiments provided below can be found in the above-mentioned limitations on the auxiliary display device 102 of LED module, which will not be repeated here.

In some embodiments, as shown in FIG. 1, the LED display includes the auxiliary display device 102 of LED module as described above, a common anode LED module 104 and a common cathode LED module 106.

The LED display may only include the auxiliary display device 102 of LED module and the common anode LED module 104, that is to say, the auxiliary display device 102 of LED module is only connected to the common anode LED module 104. The LED display may also only include the auxiliary display device of LED module 102 and the common cathode LED module 106, that is to say, the auxiliary display device 102 of LED module is only connected to the common cathode LED module 106. The LED display screen can also include an auxiliary display device 102 of LED module, a common anode LED module 104 and a common cathode LED module 106, that is to say, the auxiliary display device 102 of LED module is connected to the common anode LED module 104 and the common cathode LED module 106. Since the auxiliary display device 102 of LED module is compatible with the LED modules of these two energy-saving technologies, it can independently and accurately supply the corresponding voltage required by the common anode LED module 104 and the common cathode LED module 106 when connecting to the supply power. Such that the LED display is compatible with most of the LED modules on the market that adopt common anode energy-saving technology and common cathode energy-saving technology.

When the auxiliary display device 102 of LED module is only connected to the common anode LED module 104, the first positive voltage and the second positive voltage output by the auxiliary display device 102 of LED module are received by the common anode in the common anode LED module 104. The common anode LED module 104 only needs a positive voltage power supply, and the first and second positive voltages are processed by the common anode and transmitted to the first LED and the second LED respectively. In some embodiments, the common anode LED module 104 connects a negative voltage resistor in series with the second LED after the common anode for processing the voltage input to the second LED to meet the requirements of the second LED.

In some embodiments, the common anode LED module 104 includes a first LED of the common anode LED module 104, a second LED of the common anode LED module 104, and a common anode constant current chip. The common anode constant current chip is connected to the first LED of the common anode LED module 104 and the second LED of the common anode LED module 104. The common cathode LED module 106 includes a first LED of the common cathode LED module 106, a second LED of the common cathode LED module 106, and a common cathode constant current chip, and the common cathode constant current chip is connected to the first LED of the common cathode LED module 106 and the second LED of the common cathode LED module 106.

In some embodiments, the constant current chip can be a common anode constant current chip and a common cathode constant current chip according to different energy-saving technologies adopted by the LED module. The constant current chip in the common anode LED module 104 is the common anode constant current chip, and the constant current chip in the common cathode LED module 106 is the common cathode constant current chip. In the LED module, because the voltage required by the LEDs is different, it is necessary to supply power to the LEDs with different voltage separately. The common anode LED module 104 includes the first LED of the common anode LED module 104 and the second LED of the common anode LED module 104. Correspondingly, the common anode constant current chip can also include a first common anode constant current chip corresponding to the first LED of the common anode LED module 104 and a second common anode constant current chip corresponding to the second LED of the common anode LED module 104. The common cathode LED module 106 includes the first LED of the common cathode LED module 106 and the second LED of the common cathode LED module 106. Correspondingly, the common cathode constant current chip can also include a first common cathode constant current chip corresponding to the first LED of the common cathode LED module 106 and a second common cathode constant current chip corresponding to the second LED of the common cathode LED module 106.

In some embodiments, the first LED may be blue and/or green LED, and this type of LED requires a higher voltage of plus or minus 3.8V. The second LED can be a red LED, and this type of LED requires a lower voltage of plus or minus 2.8V.

In order to better understand the above solution, in combination with the application environment shown in FIG. 1, a detailed explanation will be given below in combination with specific embodiments.

In some embodiments, the LED display includes a common anode LED module 104, a common cathode LED module 106 and an auxiliary display device 102 of LED module. As shown in FIG. 3 and FIG. 10, the auxiliary display device of the LED module 102 includes a shared hub 202, a dual output power 302, a black screen control circuit 502, an inductor 1002 and a driver 1004. As shown in FIG. 2 and FIG. 4, the shared hub 202 has a dual input port and an independent output port, the dual input port includes a first input port and a second input port, and the first input port and the second input port are connected to the dual output power 302. The circuit structure of the black screen control circuit 502 is shown in FIG. 9, and the connection relationship of the inductor 1002 with the driver 1004 and the shared hub 202 is shown in FIG. 10.

The LED module is divided into a common anode LED module 104 and a common cathode LED module 106 according to different packaging structures of the LED. The common anode LED module 104 adopts common anode energy-saving technology, and the common cathode LED module 106 adopts common cathode energy-saving technology. The first LED of the common anode LED module 104 and the first LED of the common cathode LED module 106 are blue and/or green LEDs, and the second LED of the common anode LED module 104 and the second LED of the common cathode LED module 106 are all red LEDs.

The dual output power 302 has dual transformers inside and outputs the dual supply voltage. The dual supply voltage includes a first voltage and a second voltage. The first voltage is plus and minus 3.8V, which supplies power to blue and/or green LEDs, and the second voltage is plus and minus 2.8V, which supplies power to red LEDs. The positive and negative voltages of the two supply powers of the shared hub 202 are completely separated, and the dual supply voltages are transmitted. When the inductor 1002 does not receive a display signal within 30 s, it sends a standby instruction to the driver 1004, and the driver 1004 sends a low level signal (high-level signal during normal operation) to the black screen control circuit 502 through the shared hub 202. The low level signal is transmitted to the control end of the NPN transistor T2 (switching transistor T2) in the black screen control circuit 502. Since the control end (i.e., the base electrode) of the NPN transistor T2 is at a low level, the NPN transistor T2 works in the cut-off state, so that the power supply is directly added to the grid electrode of the PMOS transistor T1 (row driver transistor T1) through the first resistor R1. When the PMOS transistor T1 works in the cut-off state, and the drain electrode has no power supply output, thereby cutting off the dual supply power of the constant current chip of the three colors LEDs, which may realize the energy-saving technology of black screen and achieve the energy-saving effect.

The technical features of the above-mentioned embodiments can be combined arbitrarily. To make the description concise, all possible combinations of the technical features in the above-mentioned embodiments are not described. However, as long as there is no contradiction in the combination of these technical features, should be considered as within the scope of this specification.

The above-described embodiments only express several implementation methods of the present application, which are described in a more specific and detailed manner. However, this should not be understood as limiting the scope of the utility model patent. It should be pointed out that, for those skilled in the art, various modifications and improvements can be made without departing from the concept of the present application, and all such modifications and improvements fall within the scope of protection of the present application. Therefore, the scope of protection of the patent application should be determined by the claims attached hereto.

What is claimed is:

1. An auxiliary display device of a light emitting diode (LED) module, comprising:
   a shared hub provided with a dual input port and an independent output port;
   wherein the dual input port is configured to receive a dual supply voltage comprising a first voltage and a second voltage; the independent output port is connected to a common anode LED module and/or a common cathode LED module; and
   the common anode LED module comprises a first LED and a second LED, and the common cathode LED module comprises a first LED and a second LED;
   the first LED of the common anode LED module and the second LED of the common anode LED module are configured to receive the first voltage; and the first LED of the common cathode LED module is configured to receive the first voltage, and the second LED of the common cathode LED module is configured to receive the second voltage.

2. The auxiliary display device according to claim 1, further comprising:
   a dual output power connected to the shared hub;
   wherein the dual output power is configured to output the dual supply voltage to the shared hub through the dual input port.

3. The auxiliary display device according to claim 1, wherein the dual input port of the shared hub comprises a first input port and a second input port, the first input port is connected to the first voltage, and the second input port is connected to the second voltage.

4. The auxiliary display device according to claim 1, further comprising:
   a black screen control circuit;
   wherein the shared hub is connected to the common anode LED module and/or the common cathode LED module through the black screen control circuit.

5. The auxiliary display device according to claim 4, wherein:
   the black screen control circuit comprises a first switch circuit and a second switch circuit;
   a control end of the first switch circuit is connected to the shared hub;
   a first end of the first switch circuit is connected to a supply power through the second switch circuit, and a second end of the first switch circuit is grounded; and
   a control end of the second switch circuit is connected to the supply power, an input end of the second switch circuit is connected to the supply power, and an output end of the second switch circuit is connected to the dual supply voltage, the common anode LED module and/or the common cathode LED module.

6. The auxiliary display device according to claim 5, wherein the black screen control circuit further comprises a filter circuit connected to the dual supply voltage and the second switch circuit.

7. The auxiliary display device according to claim 5, wherein:
   the second switch circuit comprises a first resistance, a first capacitor, a first inductance and a row driver transistor;
   the supply power is connected to a grid electrode of the row driver transistor through a parallel connection of the first resistance and the first capacitor;
   the supply power is connected to a source electrode of the row driver transistor;
   the supply power is connected to a drain electrode of the row driver transistor through the first inductance; and
   an output of the drain electrode of the row driver transistor is configured to drive the dual supply voltage to supply power to the common anode LED module and/or the common cathode LED module.

8. The auxiliary display device according to claim 5, further comprising:
   an inductor and a driver;
   wherein the inductor is connected to the driver, and the driver is connected to the shared hub;
   the driver is configured to receive a standby instruction sent by the inductor, and is configured to send a low level signal to the shared hub; and
   the low level signal is configured to control the black screen control circuit to cut off, and the standby instruction is an instruction sent by the inductor when the inductor fails to receive a display signal during a preset time.

9. A light emitting diode (LED) display, comprising the auxiliary display device according to claim 1, a common anode LED module and/or a common cathode LED module.

10. The LED display according to claim 9, wherein:
   the common anode LED module comprises a first LED of the common anode LED module, a second LED of the common anode LED module, and a common anode constant current chip, and the common anode constant current chip is connected to the first LED of the common anode LED module and the second LED of the common anode LED module; and
   the common cathode LED module comprises a first LED of the common cathode LED module, a second LED of the common cathode LED module, and a common cathode constant current chip, and the common cathode constant current chip is connected to the first LED of the common cathode LED module and the second LED of the common cathode LED module.

\* \* \* \* \*